United States Patent
Survant (10) Patent No.: US 9,325,227 B2
(45) Date of Patent: Apr. 26, 2016

(54) CUTTING APPARATUS

(71) Applicant: Jon Wayne Survant, Owensboro, KY (US)

(72) Inventor: Jon Wayne Survant, Owensboro, KY (US)

(*) Notice: Subject to any disclaimer, the term of this patent is extended or adjusted under 35 U.S.C. 154(b) by 712 days.

(21) Appl. No.: 13/784,892

(22) Filed: Mar. 5, 2013

(65) Prior Publication Data

US 2014/0251107 A1    Sep. 11, 2014

(51) Int. Cl.
*H02K 15/00* (2006.01)
*H02K 7/14* (2006.01)
*F04D 29/053* (2006.01)

(52) U.S. Cl.
CPC .......... *H02K 15/0006* (2013.01); *F04D 29/053* (2013.01); *F05D 2230/70* (2013.01); *F05D 2230/80* (2013.01); *H02K 7/14* (2013.01); *Y10T 83/667* (2015.04); *Y10T 83/889* (2015.04)

(58) Field of Classification Search
CPC ........ B25B 11/002; B25B 27/12; B25B 27/02
See application file for complete search history.

(56) References Cited

U.S. PATENT DOCUMENTS

| | | | | |
|---|---|---|---|---|
| 5,718,420 | A | * | 2/1998 | Bernstein .................. B25B 5/08 269/139 |
| 5,816,568 | A | * | 10/1998 | Fox .......................... B25B 5/14 269/111 |
| 2009/0026679 | A1 | * | 1/2009 | Harman, III ............ F41C 27/00 269/43 |
| 2014/0251107 | A1 | * | 9/2014 | Survant .............. H02K 15/0006 83/743 |

* cited by examiner

*Primary Examiner* — Lee D Wilson
(74) *Attorney, Agent, or Firm* — Gary K. Price (57) ABSTRACT

A cutting apparatus that includes a base member having a receptacle designed for receiving an accessory, for example a shaft cutting guide when cutting a shaft of an electric motor, or a shaft removal pedestal when cutting a shaft of an electric fan motor. The receptacle is centrally disposed on a first member on the base. The receptacle defines a chamber and a bore for threadably receiving a wing screw, the wing screw for releasably securing the accessory received in the chamber of the receptacle. The shaft cutting guide includes a sleeve sized and shaped for receiving a motor's shaft. The sleeve includes a bore for threadably receiving a wing screw, the wing screw for releasably securing the motor's shaft received in the sleeve. The sleeve further defines a blade guide for guiding a cutting tool during the cutting operation, and includes a mounting shaft sized and shaped for receipt in the chamber of the receptacle.

18 Claims, 9 Drawing Sheets

CUTTING APPARATUS

CROSS REFERENCES TO RELATED APPLICATIONS

U.S. Provisional Application for Patent No. 61/634,770, filed Mar. 6, 2012 which is hereby incorporated by reference. Applicant claim priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable.

BACKGROUND OF THE INVENTION

1. Field of the Invention

The present invention relates to a cutting apparatus, more particularly to a cutting apparatus for cutting electric motor shafts.

2. Brief Description of Prior Art

When replacing electric motors with new universal motors, technicians must often shorten the new motor's shaft. The problem is keeping the motor from moving, shaft from spinning, and saw blade from sliding on shaft all at the same time while cutting the shaft. When using electric saws this can be potentially hazardous.

Another problem technicians encounter is the fan blade on the old motor is difficult to remove due to corrosion.

To overcome the shortcomings of the prior art, the present invention tends to provide a cutting apparatus for cutting electric motor shafts, making motor replacing easier, faster, and safer.

SUMMARY OF THE INVENTION

A cutting apparatus for cutting electric motor shafts that generally includes a base member having a receptacle designed for receiving an accessory, for example a shaft cutting guide when cutting a shaft of an electric motor, or a shaft removal pedestal when cutting a shaft of an electric fan motor.

The base member includes a first support in parallel relation to a second support, and a first feet member in parallel relation to a second feet member, where the first and second supports are connected to and in perpendicular relation to the first and second feet members.

The receptacle is centrally disposed on the first feet member. The receptacle defines a chamber and a bore for threadably receiving a wing screw, the wing screw for releasably securing the accessory received in the chamber of the receptacle.

The shaft cutting guide includes a sleeve sized and shaped for receiving a motor's shaft. The sleeve includes a bore for threadably receiving a wing screw, the wing screw for releasably securing the motor's shaft received in the sleeve. The sleeve further defines a blade guide for guiding a cutting tool during the cutting operation. The shaft cutting guide further includes a mounting shaft sized and shaped for receipt in the chamber of the receptacle.

Other objects, advantages and novel features of the present invention will become more apparent from the following detailed description when taken in conjunction with the accompanying drawings.

DESCRIPTION OF THE PREFERRED EMBODIMENT

The apparatus of the present invention is directed to a cutting tool that is used in association with cutting electric motor shafts. More particularly, the described cutting apparatus relates to a tool used to keep the electric motor from moving, shaft from spinning, and saw blades from sliding on the shaft when cutting the motor's shaft. Specifically, it will be noted in the following description that the present invention discloses a tool that supports and cradles the motor and fixedly secures the motor's shaft during the cutting operation. In the broadest context, the cutting apparatus as disclosed consists of components configured and correlated with respect to each other so as to attain the desired objective.

Figure 1:
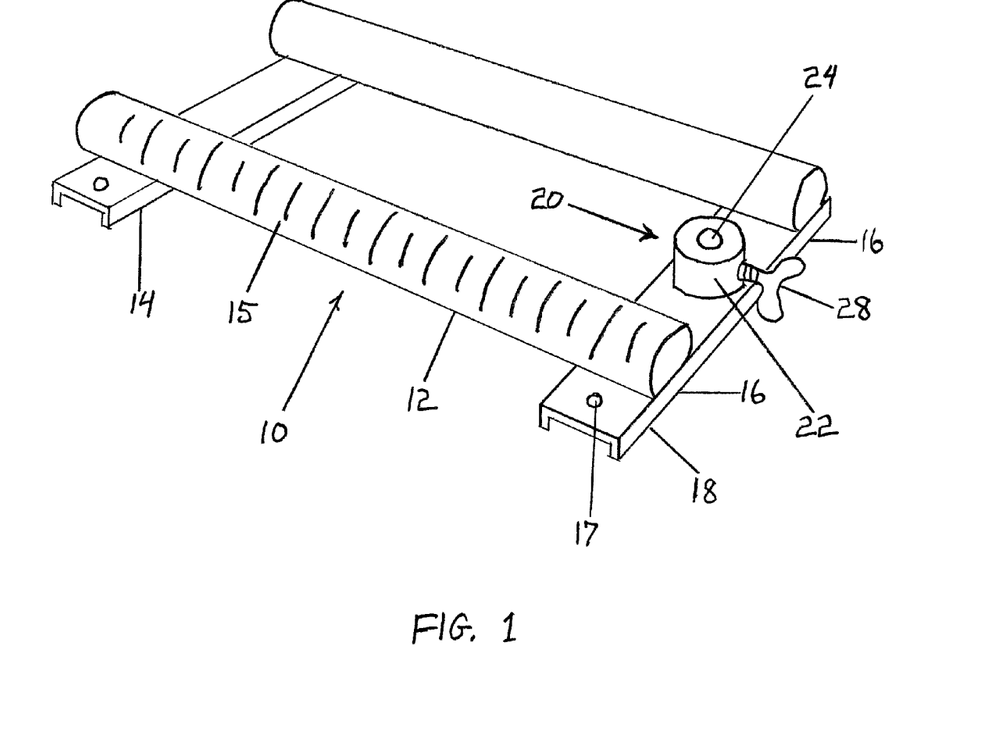
FIG. 1 is a perspective view of a cutting apparatus in accordance with the present invention.

FIGS. 1-7 illustrate a preferred embodiment of a cutting apparatus made in accordance with the present invention. The apparatus generally consisting of the following components:

Base 10—holds the motor stationary during the cutting operation.

Receptacle 20—for attaching an accessory, such as the shaft cutting guide 30, or shaft removal pedestal 40 to the base 10.

Figure 1A:
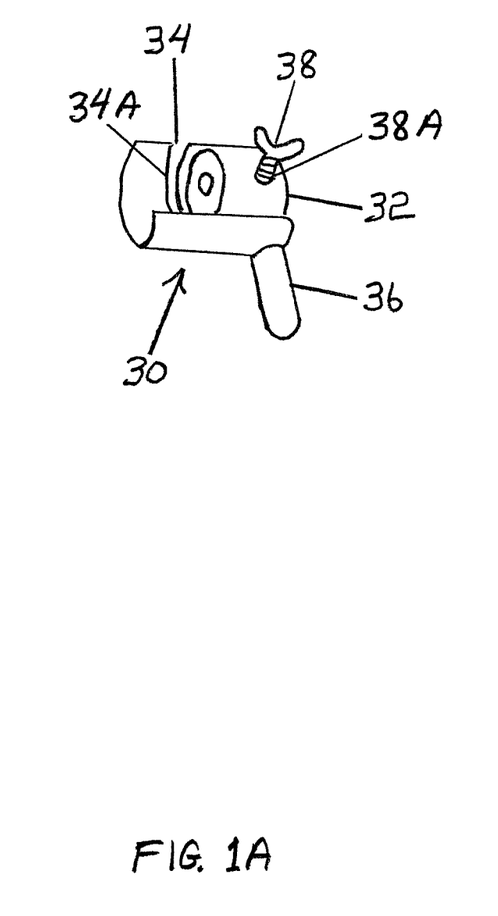
FIG. 1a is a perspective view of a shaft cutting guide used with the cutting apparatus of FIG. 1.

Shaft cutting guide 30—aligns & guides the cutting tool when cutting a motor shaft.

Figure 2:
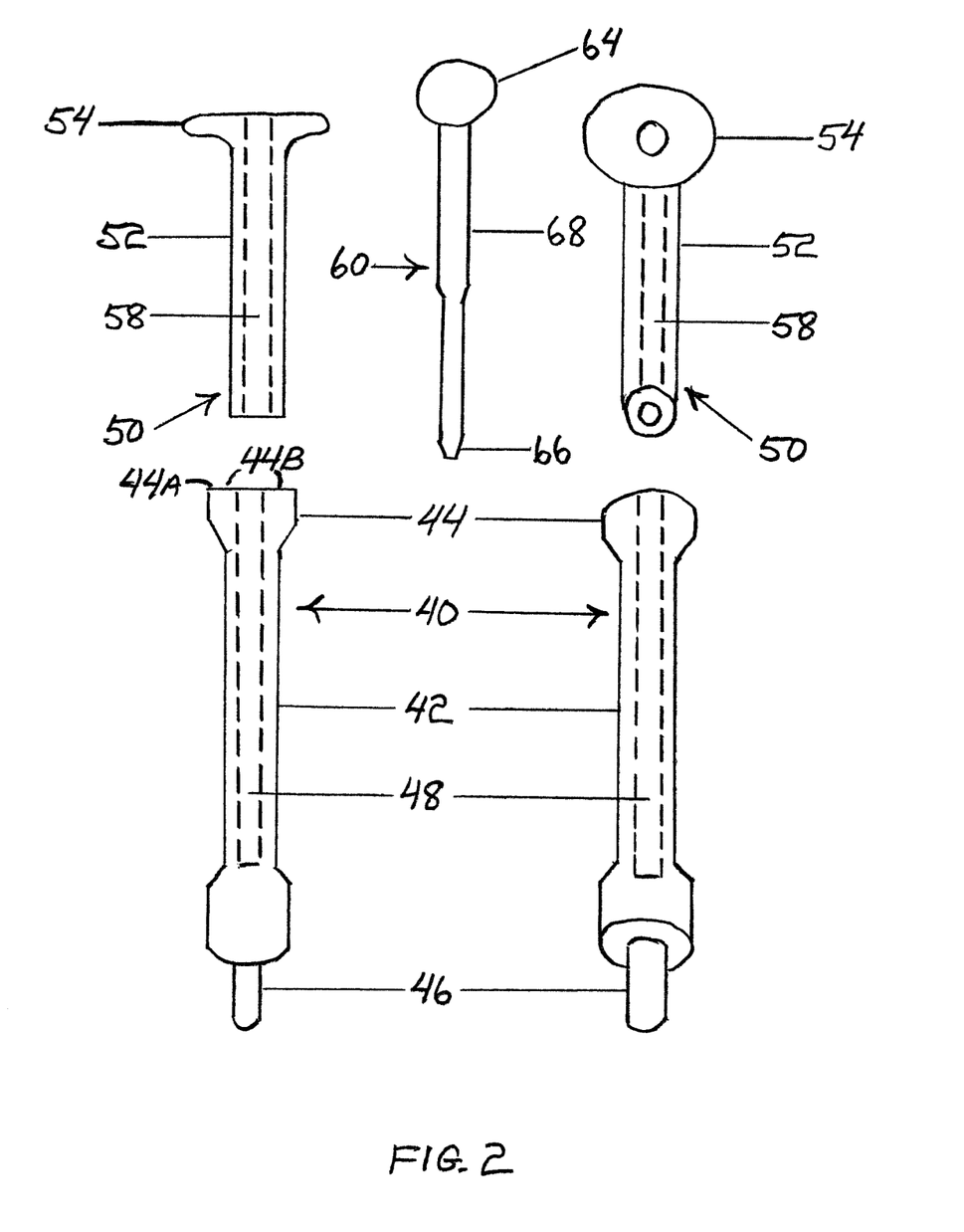
FIG. 2 is a side view of a shaft removal pedestal, a punch guide, and punch.

Shaft removal pedestal 40—supports the fan blade so the shaft being removed from the fan blade can be punched out of the fan blade hub.

Punch guide 50—aligns & guides punch 60 when driving out the shaft being removed from the fan blade.

Steel punch 60—drives out the shaft being removed from the fan blade.

Figures 3, 4:
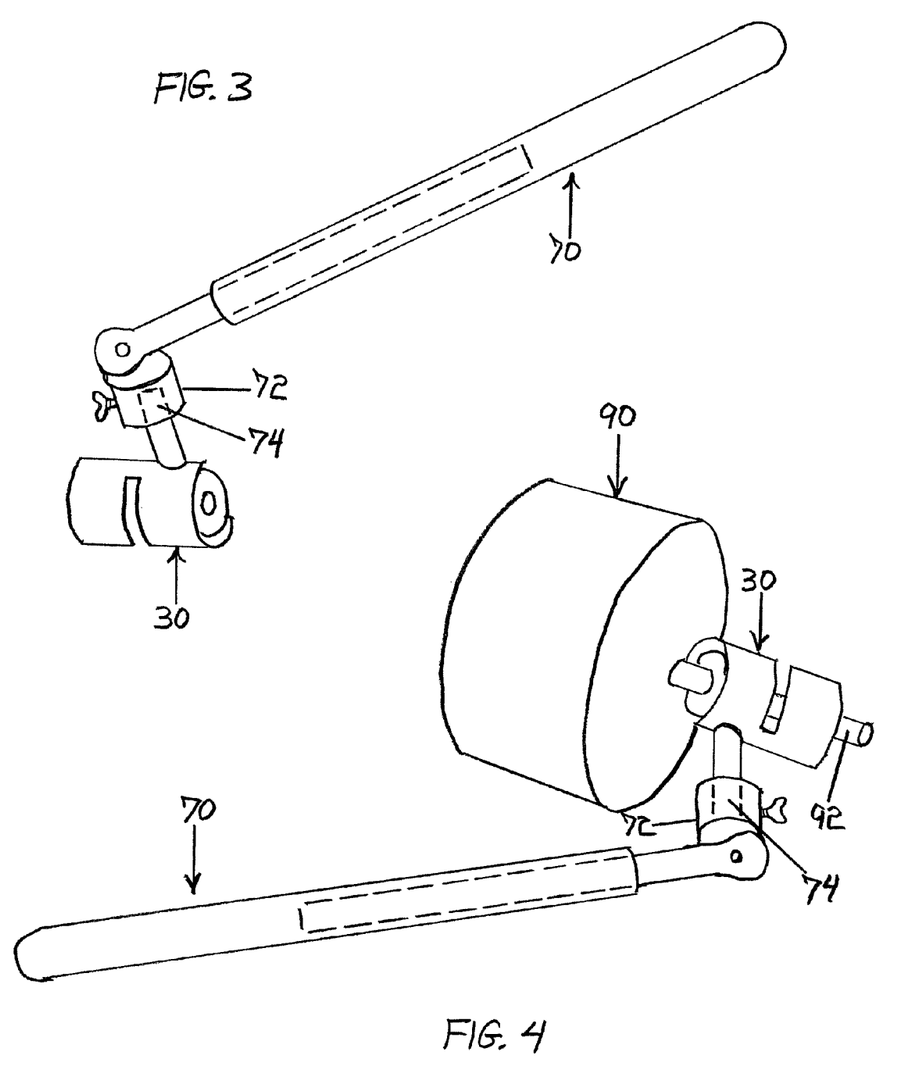
FIG. 3 is a perspective view of a handle with a shaft cutting guide attached.
FIG. 4 is a perspective view of a handle with shaft cutting guide attached, installed on a motor's shaft of a motor.

Handle 70—used with shaft cutting guide 30 when not using the base 10.

Base 10:

Base consists of two motor supports 12 running parallel to each other to cradle the motor 90. Supports 12 can be made with pipe, angle, or other shapes that would cradle the motor 90 and prevent the motor 90 from rolling. A pair of feet 14 connects to the supports 12 at right angles toward the ends 12a of 12b of the supports 12. The pair of feet 14 should extend past supports 12 to allow for mounting holes 17. The pair of feet 14 should be magnetized or incorporate magnets 16 to secure base 10 to metal surfaces such as truck beds, van floors, steel tables, etc. (not shown). The pair of feet 14 may further include skid resistant pads or covers 18 to further prevent movement when being used. The supports 12 may display scale measurements 15 starting in line with blade guide 34 when shaft cutting guide 30 is installed in receptacle 20.

Figure 8:
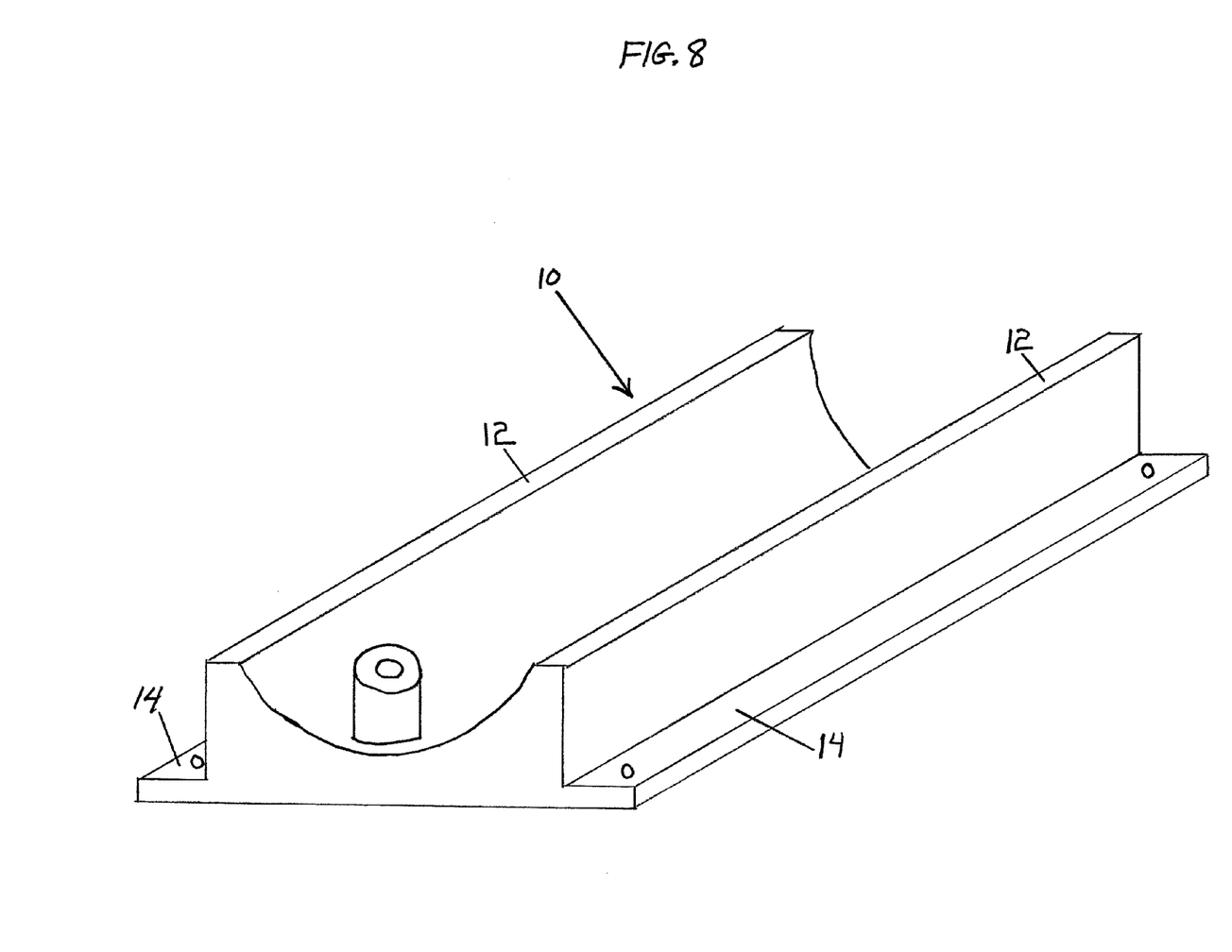
FIG. 8 is a perspective view of an alternative embodiment of the present invention.

Alternatively, as shown in FIG. 8, the feet 14 may be integral to the supports 12.

Figure 9:
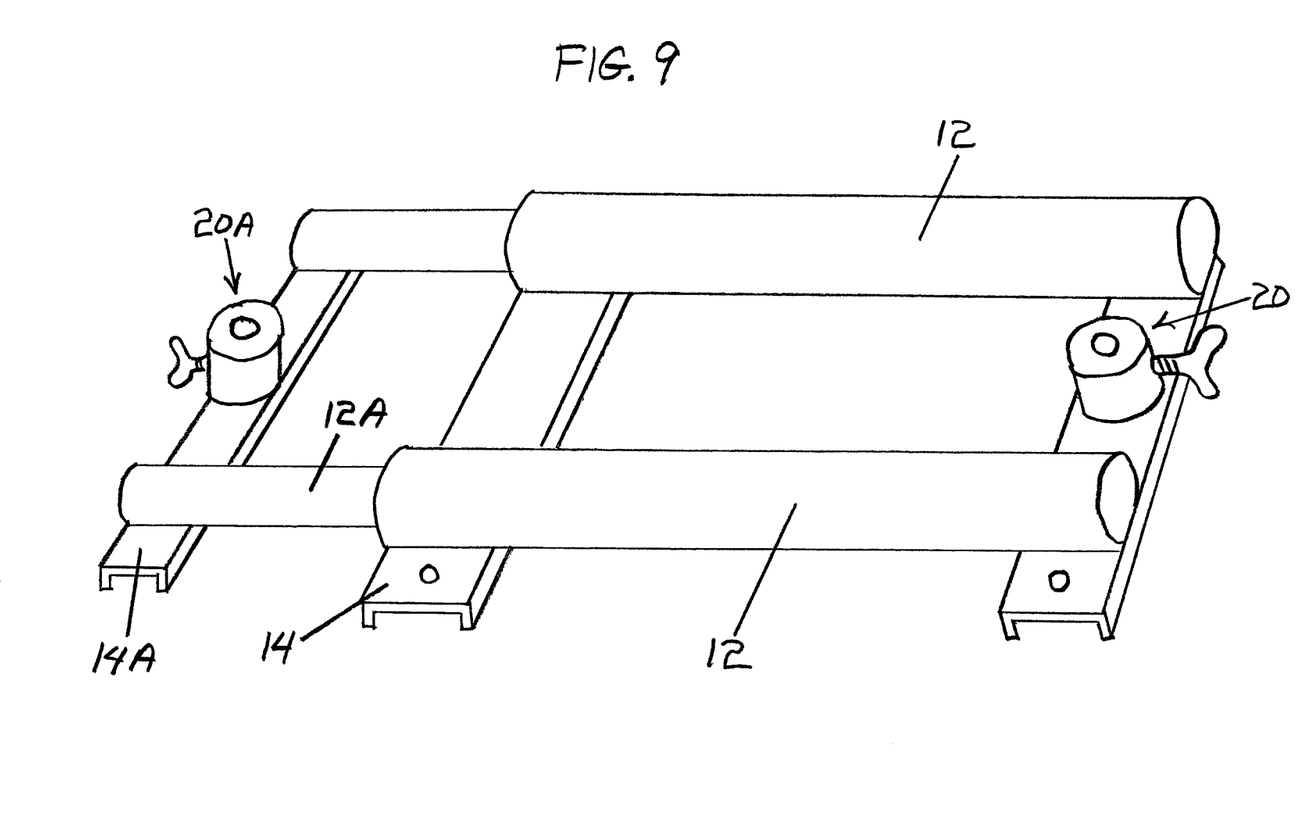
FIG. 9 is a perspective view of an alternative embodiment of the present invention, having extendable support members.

FIG. 9 illustrates a second alternative embodiment, wherein each of the supports 12 includes telescopic extensions 12a that connect to a third feet 14a. In this alternate embodiment, a second receptacle 20a can be centrally disposed on the third feet 14a. The second receptacle 20a having all the embodiments as the receptacle 20.

Receptacle 20:

Receptacle 20 consists of a hub 22 with accessory chamber 24 (which could be round, square, hexagon, etc.) to releasably attach the shaft cutting guide 30, the shaft removal pedestal 40, or other accessory to the base 10. A wing screw 28 (or other means of securing) facing outward secures the accessory within the chamber 24. In the preferred embodiment, receptacle 20 is permanently attached to one of the feet 14 centered between the two supports 12. In the alternative, receptacle 20 is integral to one of the feet 14 of the base 10 (see FIG. 8).

Shaft Cutting Guide 30:

Shaft cutting guide 30 consists of a sleeve 32 sized for receiving the motor's shaft 92 for cutting. A wing screw 38 (or other means of securing) is received in threaded bore 38a to secure the motor's shaft 92 in the sleeve 32. Adjacent the sleeve 32 is the blade guide 34 for guiding a cutting tool such as a hacksaw, or reciprocating saw (not shown) at a right angle to the motor's shaft 92. The cutting guide 30 should be made of hardened steel for quality and endurance. As illustrated, the blade guide 34 defines a length 34a that in application, is perpendicular to the motor's shaft 92 (see FIG. 5).

The shaft cutting guide 30 further includes a mounting shaft 36 sized and shaped for inserting into the chamber 24 of the receptacle 20.

Figure 6:
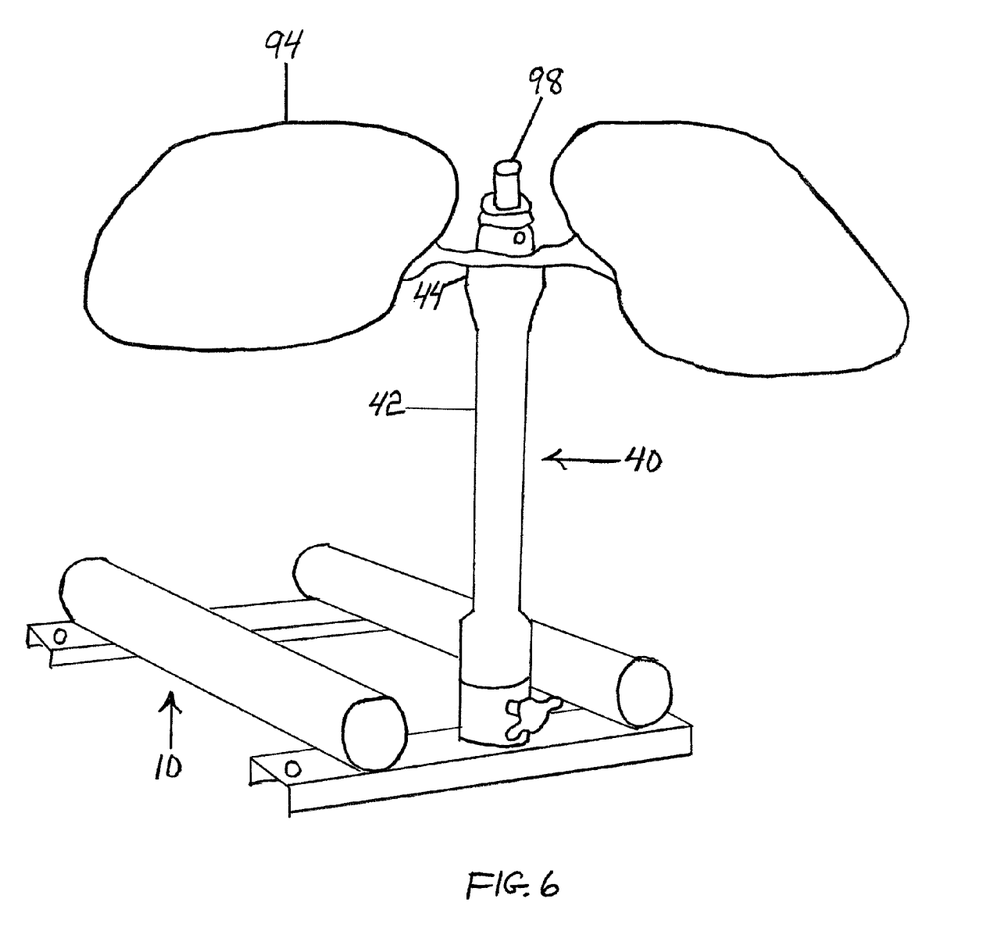
FIG. 6 is a perspective view of a fan blade installed on a shaft removal pedestal on the cutting apparatus of FIG. 1.

Shaft Removal Pedestal 40:

Shaft removal pedestal 40 consists of a sleeve 42 that includes an inside chamber 48 that is slightly larger than the shaft 98 being removed from a fan blade 94 such that in application, the shaft 98 can be inserted into pedestal 40 and drove down out of the fan blade 94 and into pedestal 40. The hub support 44 is preferably large enough to support fan blade hub 96 while shaft 98 is being removed. In the preferred embodiment, the hub support 44 having a distal end 44a that includes magnets 44b to help secure and balance the fan blade hub 96 until punch guide 50 is installed on top of hub 96. Attached to the bottom of the shaft removal pedestal 40 is the mounting shaft 46 sized and shaped for inserting into the chamber 24 of the receptacle 20.

Figure 7:
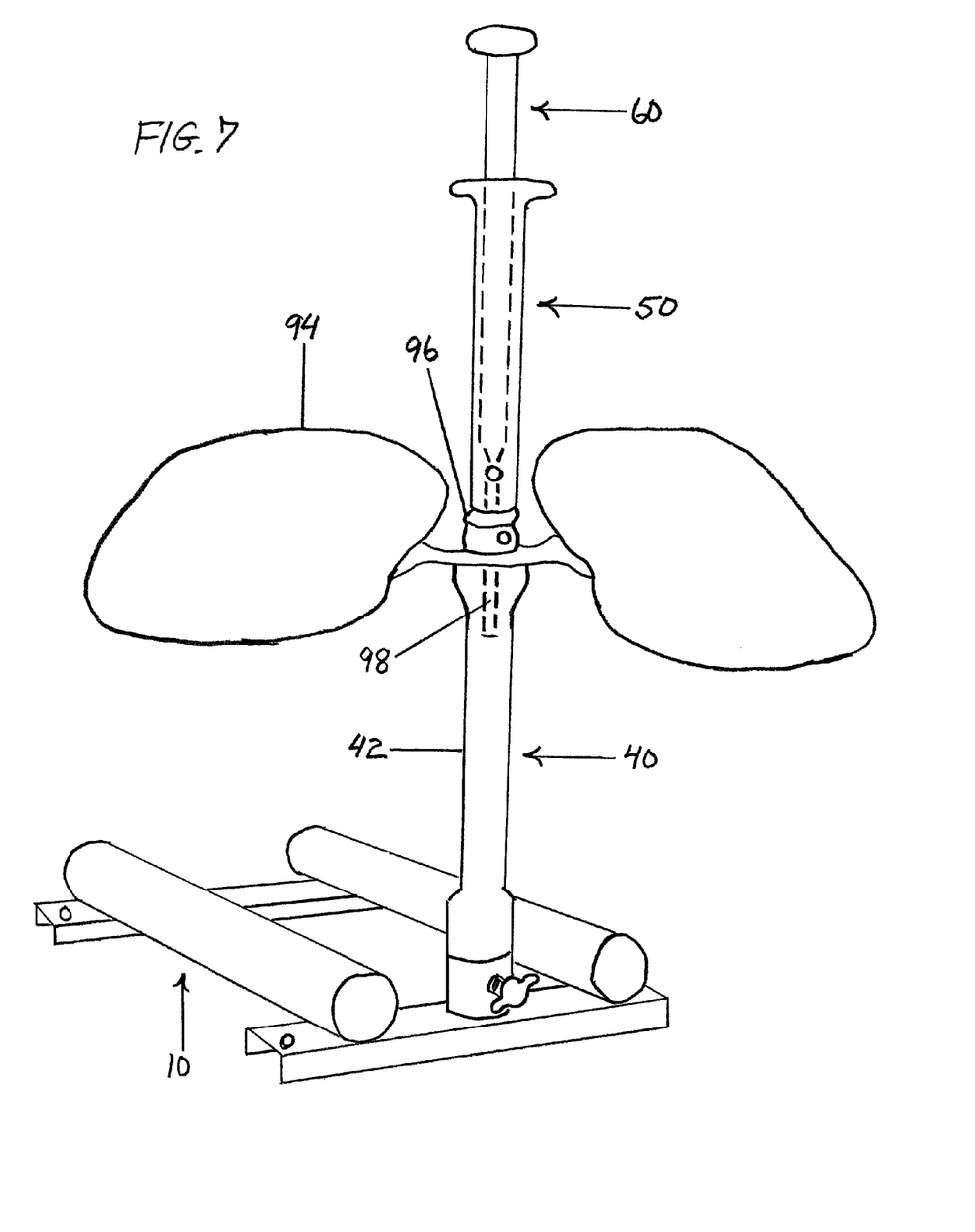
FIG. 7 is a perspective view of a fan blade installed on shaft removal pedestal on the cutting apparatus, with a punch guide and a steel punch installed on top of the fan blade hub.

Punch Guide 50:

Punch guide 50 consists of a sleeve 52 that includes an inside chamber 58 that is slightly larger than the shaft 98 being removed from fan blade 94 such that in application, the punch guide 50 can be slid down over the shaft 98 and on top of the fan blade hub 96. The punch guide 50 aligns punch 60 with center of shaft 98 and prevents punch 60 from kicking off or deforming the end of shaft 98 being removed. The protective flange 54 on top of punch guide 50 helps protect the user's hand and provide a stop for punch 60.

Punch 60:

Punch 60 consists of staff 68 designed to close tolerances of chamber 58 of punch guide 50 so that in application, punch tip 66 stays aligned with the center of shaft 98 when being struck with the punch 60. The staff 68 should be long enough to extend through punch guide 50 and fan blade hub 96 in order to extract shaft 98 from fan blade 94. The punch 60 has a flanged head 64 for easier striking, and to stop punch 60 at protective flange 54 of punch guide 50. Punch 60 should be made of hardened steel for quality and endurance.

Handle 70:

Handle 70 includes a swivel receptacle 72 having an accessory chamber 74 having the approximate same size and shape as accessory chamber 24 to attach shaft cutting guide 30 for using shaft cutting guide 30 without base 10 in situations where, for example, motor 90 may already be mounted to equipment. The opposite end of the handle 70 can be secured to the motor 90 to prevent the motor's shaft 92 and shaft cutting guide 30 from moving while cutting the shaft 92. This may be accomplished by magnetizing the handle 70 or by clamping the handle 70 to the motor 90 with means of a band clamp, hook & loop strap, elastic band, etc. The handle 70 might be adjustable in length to be more versatile when using. In addition to using with the shaft cutting guide 30, the handle 70 could be similarly used with the other accessories.

Figure 5:
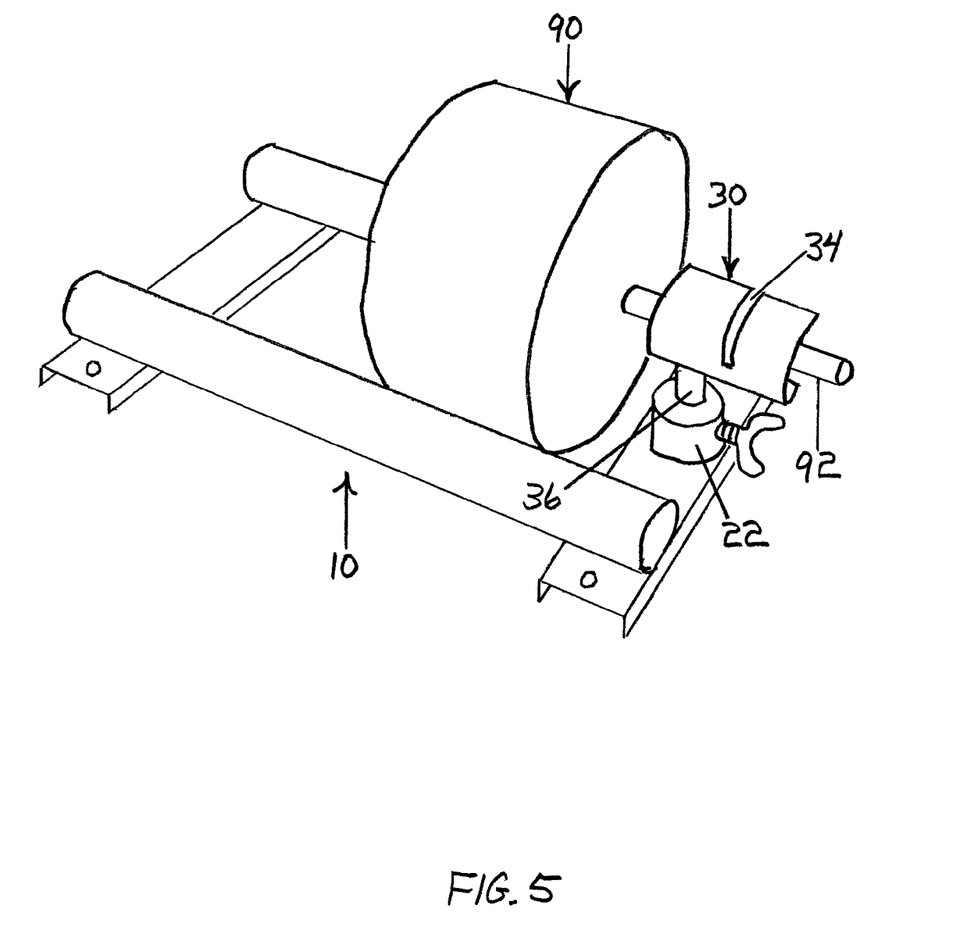
FIG. 5 is a perspective view of a motor on the cutting apparatus of FIG. 1, and further illustrates the motor's shaft inserted in the shaft cutting guide to be cut.

To Use Shaft Cutting Guide 30 with Base 10:

Install shaft cutting guide 30 into receptacle 20 on base 10 as discussed. Lay the motor on the supports 12 of the base 10 and insert the motor's shaft 92 into guide sleeve 32 to the desired position. The shaft 92 is then secured with wing screw 38 tightened on the flat section of motor's shaft 92. Once secured, you can cut the shaft 92 using your choice of cutting tool (hacksaw, reciprocating saw, etc.). After shaft 92 has been cut, wing screw 38 is loosened and motor can be removed or left on base 10 while you file the end of the motor shaft 92 and prepare motor for installation.

To Use Shaft Cutting Guide 30 with Handle 70:

Install shaft cutting guide 30 into receptacle 72 on handle 70 and secure with wing screw 78. The guide sleeve 32 is then slid on the motor's shaft 92 to the desired position and secured with the wing screw 38 tightened on the flat section of motor's shaft. The handle 70 can be secured to the motor or held by hand while cutting the motor's shaft 92. After the shaft 92 has been cut, wing screw 38 is loosened and handle 70 and guide 30 removed.

To Use Shaft Removal Pedestal 40:

Install shaft removal pedestal 40 into chamber 24 of receptacle 20. In order to remove a stuck fan blade on a motor that is being replaced without damaging the fan blade, the technician will need to first cut the shaft 98 of the old motor between the motor housing and the fan blade to free the fan blade from motor. Then after loosening the set screw, cleaning & lubricating the shaft and fan blade hub, you can insert one end of shaft 98 being removed into shaft removal pedestal 40 with fan blade hub resting on hub support 44. Then using punch guide 50 and steel punch 60 the shaft can be driven down into pedestal sleeve 42 and out of fan blade allowing you to reuse the fan blade on the new motor being installed.

Although the description above contains many specificities, these should not be construed as limiting the scope of the invention but is merely providing illustrations of some of the presently preferred embodiments of this invention. Thus the scope of the invention should be determined by the appended claims in the formal application and their legal equivalence, rather than by the examples given.

I claim:

1. A cutting apparatus for cutting electric motor shafts, said cutting apparatus comprising:
    a base member comprising:
    a first support in parallel relation to a second support,
    a first feet member in parallel relation to a second feet member,
    wherein said first and second supports are in perpendicular relation to said first and second feet members, and wherein said first and second supports each include a first side and a second side, said first feet member connected to the second side of a first end of said first and second supports, and, said second feet member connected to the second side of a second end of said first and second supports, a receptacle member centrally disposed on a first side of said first feet member, said receptacle member defining a chamber and a bore for threadably receiving a wing screw, said wing screw for releasably securing a shaft cutting guide received in said chamber;

said shaft cutting guide defines a sleeve sized and shaped for receiving a motor's shaft, said sleeve including a bore for threadably receiving a cutting guide wing screw, said cutting guide wing screw for releasably securing the motor's shaft received in said sleeve, wherein said sleeve further defines a blade guide for guiding a cutting tool, said blade guide defining a length that is perpendicular to the motor's shaft, said shaft cutting guide further including a mounting shaft sized and shaped for receipt in said chamber.

2. The cutting apparatus as recited in claim 1, wherein said first and second feet members each include mounting holes.

3. The cutting apparatus as recited in claim 1, wherein said first and second feet members each include magnets disposed on a second side.

4. The cutting apparatus as recited in claim 1, wherein said first and second feet members each include skid resistant pads disposed on a second side.

5. The cutting apparatus as recited in claim 1, further include scale measurements that display on the first side of said first and second supports.

6. The cutting apparatus as recited in claim 1, wherein said receptacle is integral to said first feet member.

7. The cutting apparatus as recited in claim 1, wherein said shaft cutting guide is configured of a hardened steel.

8. A cutting apparatus comprising:
first and second support members attached to first and second base members, wherein said first and second support members are perpendicular to said first and second base members, a receptacle member centrally disposed on a first side of said first base member, said receptacle member defining a chamber for receiving an accessory, and a bore for threadably receiving a wing screw, said wing screw for releasably securing said accessory received in said chamber.

9. The cutting apparatus as recited in claim 8, wherein said accessory is a shaft cutting guide comprising:
a sleeve sized and shaped for receiving a motor's shaft, said sleeve including a bore for threadably receiving a cutting guide wing screw, said cutting guide wing screw for releasably securing the motor's shaft received in said sleeve, and wherein said sleeve further defines a blade guide, said blade guide having a length that is perpendicular to the motor's shaft, said blade guide for guiding a cutting tool.

10. The cutting apparatus as recited in claim 9, wherein said shaft cutting guide further including a mounting shaft sized and shaped for receipt in said chamber.

11. The cutting apparatus as recited in claim 8, wherein said accessory is a shaft removal pedestal comprising:
a sleeve sized and shaped for receiving a shaft,
a hub support, and
a mounting shaft sized and shaped for receipt in said chamber.

12. The cutting apparatus as recited in claim 11, wherein said hub support includes magnets disposed at a distal end.

13. The cutting apparatus as recited in claim 8, wherein said first and second base members each include mounting holes.

14. The cutting apparatus as recited in claim 8, wherein said first and second feet members each include magnets disposed on a second side.

15. The cutting apparatus as recited in claim 8, wherein said first and second feet members each include skid resistant pads disposed on a second side.

16. A cutting apparatus comprising:
a base including a first member,
a receptacle member centrally disposed on said first member,
said receptacle member defining a chamber and means for releasably securing an accessory within said chamber.

17. The cutting apparatus as recited in claim 16, wherein said accessory is a shaft cutting guide comprising:
a sleeve sized and shaped for receiving a motor's shaft, said sleeve including a bore for threadably receiving a cutting guide wing screw, said cutting guide wing screw for releasably securing the motor's shaft received in said sleeve, wherein said sleeve further defines a blade guide, said blade guide having a length that is perpendicular to the motor's shaft, and wherein said shaft cutting guide further including a mounting shaft sized and shaped for receipt in said chamber.

18. The cutting apparatus as recited in claim 16, wherein said accessory is a shaft removal pedestal comprising:
a sleeve sized and shaped for receiving a shaft,
a hub support that defines a distal end,
magnets disposed on said distal end, and
a mounting shaft sized and shaped for receipt in said chamber.

* * * * *